Figure 1:
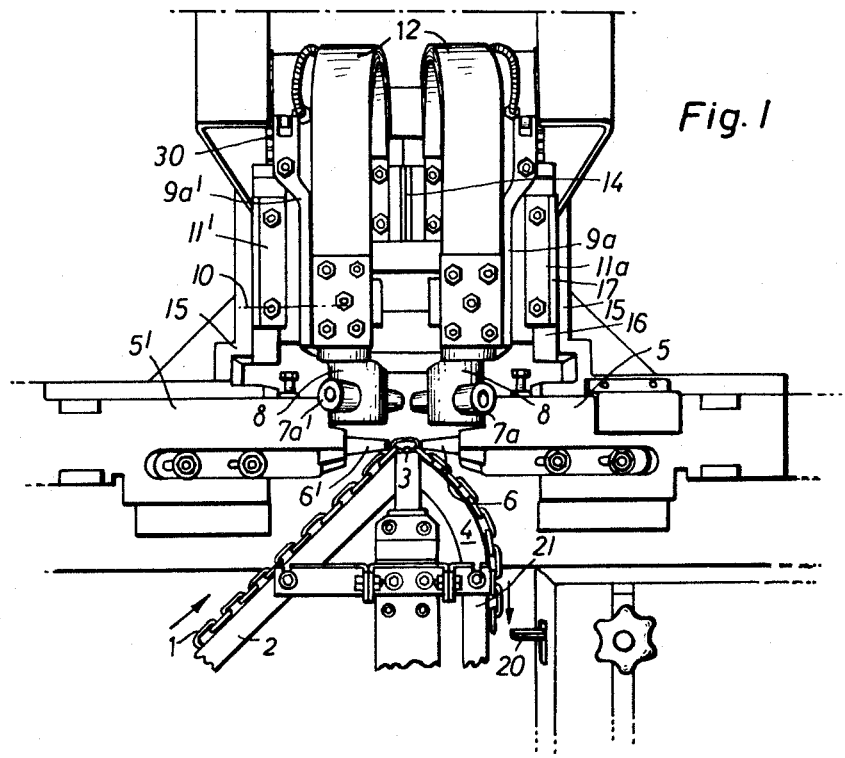

July 6, 1965 K. KLEINE-WEISCHEDE 3,193,655

CHAIN WELDING MACHINE

Filed Dec. 7, 1962 5 Sheets-Sheet 1

3,193,655
CHAIN WELDING MACHINE
Karl Kleine-Weischede, Cologne-Raderthal, Germany
(Hauptstrasse 40, Gersweiler, near Saarbrucken, Germany)
Filed Dec. 7, 1962, Ser. No. 243,030
Claims priority, application Germany, Dec. 19, 1961,
M 51,225
6 Claims. (Cl. 219—51)

The invention relates to a chain welding machine having pairs of electrodes which can be pressed against the ends of a chain link to be welded together and which are so arranged and guided that they can follow the upsetting movement.

The purpose of such electrode guiding means is to avoid sliding of the electrodes along the surface of the chain link when the link ends are upset because otherwise burning occurs which considerably reduces the load carrying capacity of the chain link.

An automatic chain welding machine is known in which each of four electrodes, which can be pressed in pairs against the ends of the link which are to be welded and upset, are each connected through two slides, one movable horizontally and the other vertically in the plane of the link, to a plunger which applies the contact pressure.

Kinematically each of the welding electrodes in this machine, subjected to high pressure, can nevertheless follow any displacement of the chain link ends being brought together in the plane of the chain link. In fact however in spite of the necessary eight slideways provided for the movement of the four welding electrodes, the movement of the electrodes in the upsetting direction is strongly resisted because the slides which have to transmit the contact pressure are in this way subjected to such strong binding on their slideways that the undesirable slipping of the electrodes on the link ends pressed towards one another by the upsetting tools cannot be reliably avoided.

The disadvantages of this known machine are partially overcome by another known machine by which two co-operating electrodes are held by two electrode levers which are moved pincer fashion from a power source which engages the lever ends and effects closing and opening movement of as well as applying the contact pressure to the pair of electrodes, and are journalled oppositely rockable in a bearing block which is displaceable perpendicularly to the upsetting direction and in the upsetting direction, and by the two bearing blocks being connected each with a piston slidable in a cylinder parallel to the upsetting direction and operable by a pressure medium. Each bearing block for the oppositely rockable electrode levers is secured to a slide so as to be movable in the upsetting direction, which slide is guided to be displaceable in the machine frame in a direction perpendicular to the direction of upsetting and to be movable from a lever linkage. The mode of operation of this known machine is as follows:

First the pairs of electrodes are lowered on to the link ends to be welded and then so released in this direction of movement that they can follow a vertical movement of the link ends during the upsetting and welding process. At the same time the electrodes are pressed against the link ends with an adjustable pressure. At the same time also the cylinders containing the pistons connected with the bearing blocks are supplied with pressure medium in such a way that the movement of the pairs of electrodes in the upsetting direction takes place approximately without resistance and at any desired contact pressure slip free co-movement of the contact surfaces of the electrodes with the chain link ends is ensured.

This known welding machine also has some disadvantages. On one hand the provision of the working cylinders for displacing the bearing blocks is expensive, on the other hand the exact timing of the individual working steps is difficult, especially if the welding machine is to work at high speed. On account of inertia moreover, in high speed machines the electrodes must be pressed against the chain link with relatively high pressure in order to avoid slipping of the electrodes on the chain links. In particular in a high speed butt welding process by which high alloy chain steel can be welded and in which high current is used and very short welding times are achieved, burn damage to the chain link cannot be avoided with the known welding machines. These burns, even when quite small, are dangerous as starting points for chain link failure.

A purpose of the invention is to mitigate the disadvantages above explained of the known chain welding machines and to provide a machine by which high alloy chain steels can be welded using high currents and short welding times without the chain links suffering burn damage.

To this end according to the invention the electrodes are positively coupled in the upsetting direction to slides carrying and guiding the upsetting tools.

In this way during the upsetting procedure the electrodes are positively carried along in the upsetting direction by the upsetting slides. Because the movement of the contact surfaces of the electrodes in the upsetting direction completely corresponds with the movement of the upsetting slides, no sliding movement of the contact surfaces of the electrodes on the surface of the chain link can occur, irrespective of the pressure of application of the electrodes and the speed of upsetting, so that burn damage is reliably avoided.

An advantageous embodiment of the invention is characterized by a respective column having a guideway perpendicular to the upsetting direction being attached to each of the two upsetting slides, and a slide being guided by each guideway to which two levers carrying respective electrodes of a pair are pivoted so as to be oppositely rockable pincer fashion in a manner in itself known. Advantageously these slides to which the levers are pivoted are guided by T-section guideways on the columns.

The slides to which the levers are pivoted and thus the pair of electrodes are compelled to share the movements of the upsetting slides also when the upsetting slides are returned to their starting positions after completion of the welding operation. As the electrodes, displaceable perpendicularly to the upsetting direction and rockable in the same plane, are positively coupled in the upsetting direction with the upsetting slides and the upsetting tools fixed thereto, the chain welding machine can operate at high speed and for example make four to eight welds per minute in the slag welding process, or eight to twelve welds in the high speed butt welding process.

The displacement of the upsetting slides is kept as small as conveniently possible on one hand, so that the two pairs of electrodes do not have to be separated too far so that the electrode head comprising two electrode pairs with the necessary packets of copper tapes, two pairs of electrode levers and two electrode slides forms a compact unit and on the other hand to attain as high a production rate as possible of the machine.

In further development of the invention in order to effect the feed movement of the chain links to be welded, the welding saddle together with the guiderails guiding the chain links to and away from the welding saddle is made downwardly movable. The downward movement of the welding saddle advantageously amounts to half the width of a chain link. By this means it becomes possible to keep the movements of both upsetting slides to a minimum because the link feed means in the lowered position of the welding saddle does not require any additional space between the upsetting tools. Also the lift of the electrode head is reduced by a corresponding amount.

Advantageously the guide rail disposed in the feed direction of the chain following the welding saddle is bent over substantially vertically and beside the vertical running part of this guide rail, a feed finger is arranged which can be displaced towards the guide rail to engage the chain to be fed and be moved in a vertical direction. By this arrangement of the guiderail which leads the chain away, the lowering of the welding saddle and the guide rails has no effect on the movements of the feed finger.

Further features of the invention will appear from the following description in which an example of chain welding machine according to the invention is described in greater detail with reference to the accompanying drawings.

Figure 2:
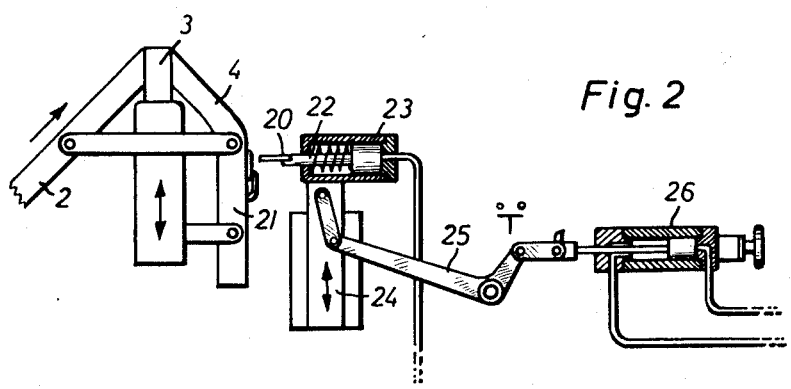
Figure 3:
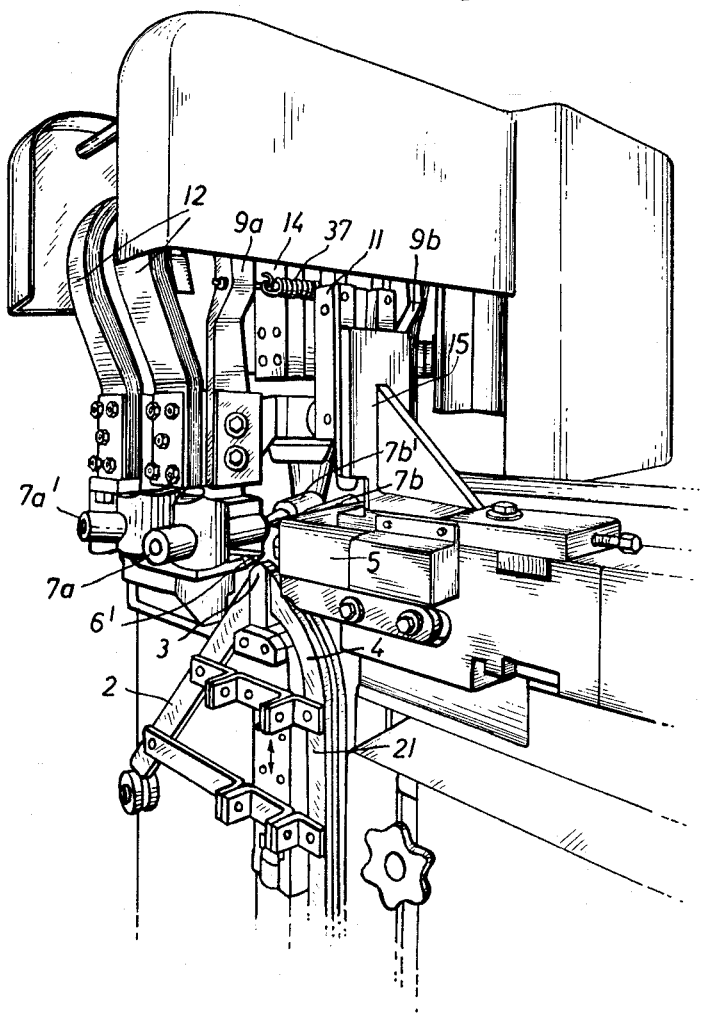
Figure 4:
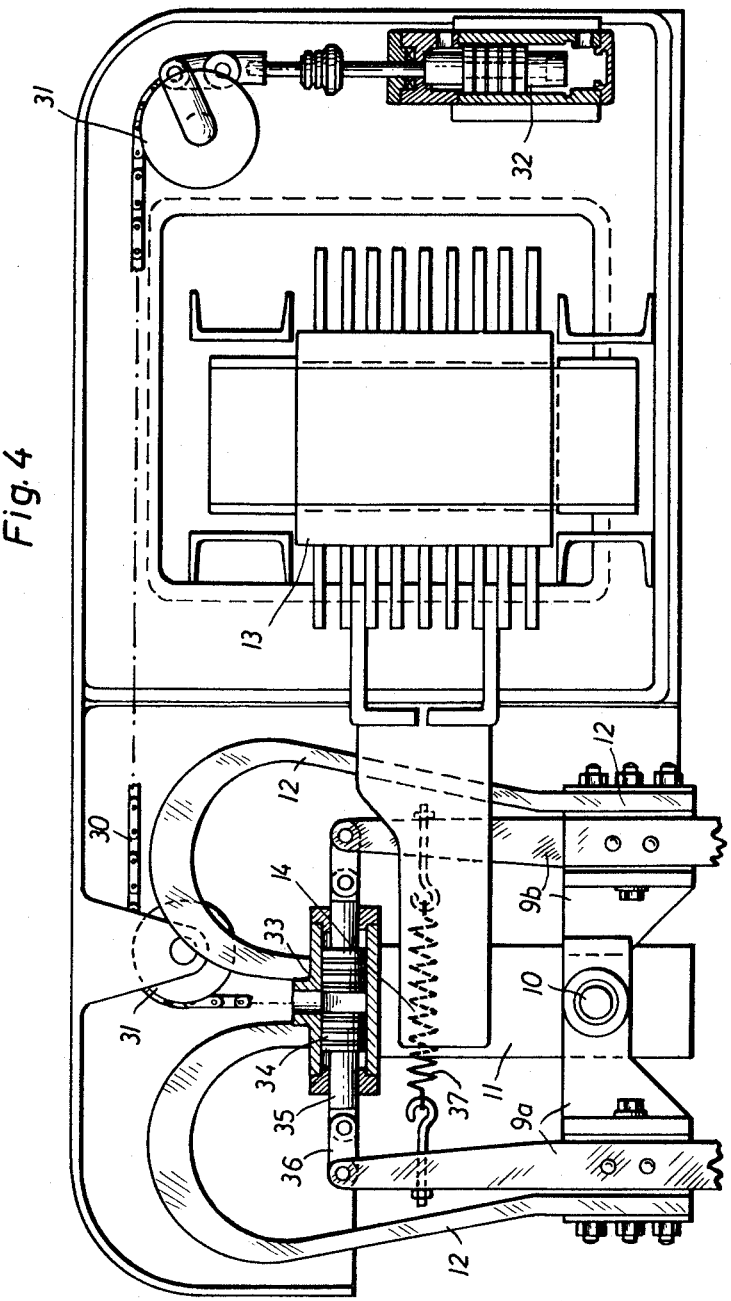
Figure 5:
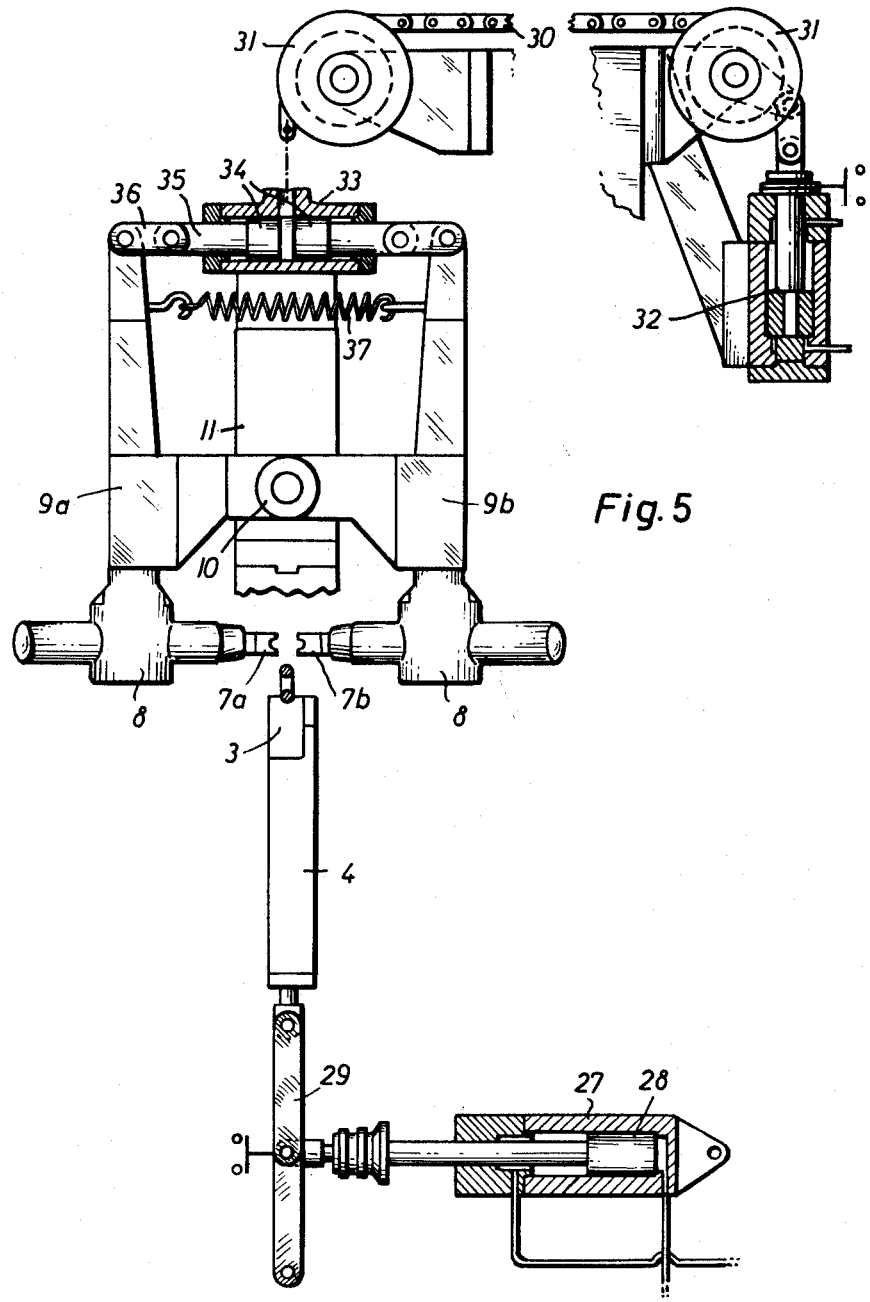
Figure 6:
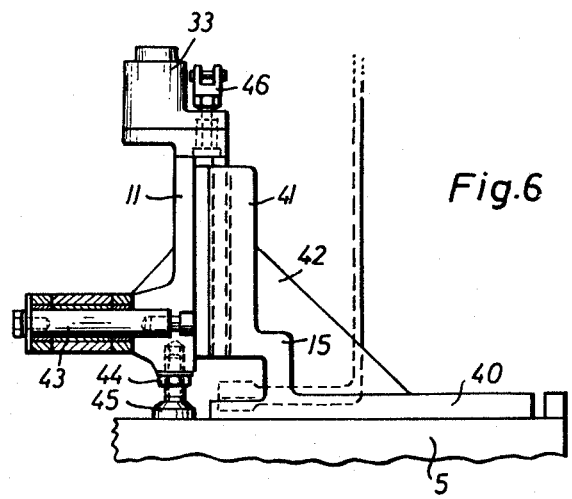
Figure 7:
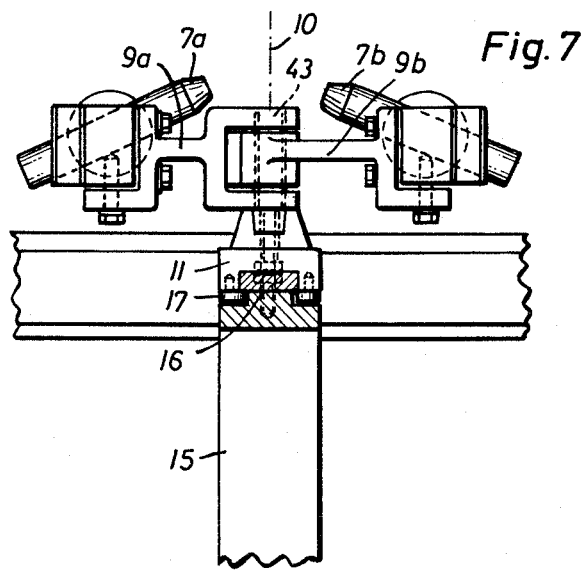

In the drawings:
FIGURE 1 is a front view.
FIGURE 2 is a detail.
FIGURE 3 is a perspective view.
FIGURE 4 is a view partly in section taken at right angles to FIGURE 1.
FIGURE 5 is a detail looking in the same direction as FIGURE 4.
FIGURE 6 is a detail side view.
FIGURE 7 is a detail in plan view.

The chain links to be welded linked together into a continuous chain, move through the machine in the direction of the arrow over a guide rail 2 to a welding saddle 3. There each second link 1 uprightly disposed is welded. The chain is led away over a guide rail 4 which is bent downwardly into the vertical. Each length of chain passes twice through the machine, the chain being turned through 90° before passing through the machine a second time over the rails 2 and 4.

The welding saddle 3 together with the guide rails 2 and 4 can be lowered and raised. The feed of the chain links 1 takes place with the saddle lowered, while the upsetting and welding of the links take place in the raised working position shown in FIGURES 1 and 3.

When the saddle 3 is in the working position two horizontally guided upsetting slides 5 and 5', to the facing ends of which upsetting tools 6 and 6' are clamped, are brought against the link to be welded and close the still open gap in the link. At the same time four electrodes co-operating in pairs, 7a, 7b and 7a', 7b' are pressed against the ends of the link to be welded.

FIGURES 1 and 3 show the electrodes in raised position.

The welding electrodes 7a, 7b and 7a', 7b' are carried in electrode holders 8 which are secured to the lower ends of electrode levers 9a, 9b and 9a', 9b' co-operating in pairs and rockable pincer fashion. These pairs of electrode levers 9a, 9b and 9a', 9b' are journalled on vertical movable electrode slides 11 and 11', rockable about axes 10. The supply of current to the electrodes is effected through four flexible packets 12 of copper tape which lead symmetrically to the rear and front electrodes 7b, 7b' and 7a, 7a' from a distributor head 14 rigidly connected to a transformer 13.

The electrode slides 11, 11' are guided by columns 15, 15' which are secured to the upsetting slides 5, 5'. The vertical guiding surfaces 16 of the columns 15, 15' are T-form in cross section and are engaged by guides 17 secured to the electrode slides 11, 11'. In this way the electrodes 7a, 7b and 7a', 7b' are compelled to share in the movements of the upsetting slides 5, 5' in the upsetting direction.

To feed the chain a feed finger 20 is provided which can be moved towards the vertically downwardly bent part 21 of the guide rail 4 so engaging the chain 1 and then drawing it downwardly through two link lengths. As shown in FIG. 2 the feed finger 20 is fastened to the piston rod 22 of a hydraulic cylinder 23 which effects the horizontal movement of the feed finger 20.

The cylinder 23 is carried by a slide 24 movable in the vertical direction and moved through a lever 25 and suitable links by a working cylinder 26.

The chain feed is effected upon completion of the welding operation and after the welding saddle 3 and the guide rails 2 and 4 have been lowered through about half the width of a chain link.

As shown in FIGURE 5, the raising and lowering of the welding saddle 3 and guide rails 2, 4 is effected by a hydraulic working cylinder 27, the piston 28 of which acts upon a toggle 29 which in its extended condition holds the welding saddle 3 in the welding position.

The electrode head comprising the welding electrodes 7a, 7b, 7a', 7b', the electrode holders 8, the electrode levers 9a, 9b, 9a', 9b' and the two electrode slides 11, 11' is raised and lowered from a hydraulic working cylinder 32 through a link or roller chain 30 which is guided over rollers 31. A counter-weight which is also connected to the electrode head by the chain serves to balance the weight of the electrode head. Between the upper ends of the pairs of electrode levers 9a, 9b and 9a', 9b' double hydraulic cylinders 33 are mounted at the upper ends of the electrode slides 11, 11', the countermoving pistons 34 of which are connected to the electrode lever through piston rods 35 and links 36 pivoted to rock in the plane of swing of the electrode levers. By actuating the pistons 34 the pairs of electrodes are pressed against the link to be welded while the opening movement of the electrodes is effected by tension springs 37 connected between the upper arms of the electrode levers 9a, 9b and 9a', 9b'.

As shown in FIGURE 6, the columns 15 secured to the upsetting slides 5 comprise angle brackets of which the horizontal arm 40 is held by screws to the top surface of the upsetting slide and on the vertical arm 41 of which the guide surfaces for the electrode slide 11 are arranged. The two limbs 40, 41 of the angle bracket are stiffened by a web 42. The pin 43 secured to the electrode slide 11 serves for the pivoting of the pair of electrode levers 9a, 9b. On the underside of the electrode slide 11 is arranged an adjustable abutment 45 lockable by a nut 44 which when the electrode head is lowered abuts against the upsetting slide 5. To the upper end of the electrode slide beside the double cylinder 33 and above the guideway, a fork 46 is secured, to which the chain 30 for lifting and lowering the electrode head is pivoted.

The movements of the upsetting slides, the electrode head, the electrode levers, the welding saddle, the feed finger and the devices for shaving off the welding ridge are effected by hydraulic cylinders and electrically controlled by the aid of electro-magnetic valves.

The mode of operation of the chain welding machine is as follows:

After the chain link to be welded has been brought into position on the welding saddle 3, this saddle is lifted through about half a chain link breadth into the welding position. The two upsetting slides 5, 5' are now moved towards one another and the upsetting tools 6, 6' press against the narrow sides of the chain link and close the gap between the link ends to be welded. At the same time the electrode head is lowered and the double cylinders 33 press the pairs of electrodes 7a, 7b and 7a', 7b' into contact with the chain link and the welding operation commences. After completion of the welding operation the electrodes 7a, 7b, 7a', 7b' are withdrawn from the chain link and the electrode head is raised whereafter the shaving off of the welding ridge takes place in known manner. Thereafter the upsetting slides 5, 5' return to their starting position, the welding saddle 3 is lowered and the feed finger 20 draws the chain forward until the next upwardly disposed chain link reaches the welding saddle 3, whereupon the next working cycle begins.

I claim:

1. A chain welding machine comprising a frame, a chain link supporting saddle mounted for vertical movement on said frame, means for moving said saddle vertically to and from a welding position, a pair of opposed slides mounted on said frame for horizontal movement toward and away from each other, upsetting tools on said slides, a vertical guideway mounted on each slide perpendicular to the direction of movement thereof, an electrode slide carried by each guideway, a pair of levers pivotally mounted on each electrode slide, a pair of opposed welding electrodes carried by each pair of levers, means to supply welding current to said electrodes and means to move said levers to move the electrodes of each pair toward and away from each other, whereby with a chain link in welding position movement of said opposed slides horizontally will move said upsetting tools into engagement with said link to brings the ends into engagement, movement of said electrode slides vertically in said guides moving said electrodes to a position opposite said link and movement of said levers moving said electrodes into engagement with said link, further simultaneous movement of said opposed slides and the electrodes carried thereby serving to upset the ends of said link and prevent slippage between said electrodes and said link.

2. A chain welding machine as defined in claim 1, in which each pair of levers is pivotally mounted on a common axis disposed substantially midway of the width of each electrode slide.

3. A chain welding machine as defined in claim 1, in which the means to move said levers comprises a fluid pressure cylinder mounted on each electrode slide, a pair of pistons slidably received in each cylinder and rods connecting said pistons with one end of the associated levers, whereby upon movement of said pistons apart the opposite ends of said levers and the electrodes carried thereby will move toward each other to bring said electrodes into engagement with said link.

4. A chain welding machine as defined in claim 1, in which an adjustable abutment is provided on each electrode slide, whereby upon downward movement of said electrode slides said abutments engage said opposed slides to positively locate said electrodes with respect to said upsetting tools.

5. A chain link welding machine as defined in claim 1, in which the means for moving said saddle to and from a welding position comprises fluid pressure operated toggle means.

6. A chain link welding machine as defined in claim 1, in which a chain guide rail is carried by said saddle, said guide rail having a substantially vertical straight portion, a feed finger disposed adjacent said straight portion, means for moving said finger into engagement with a link of a chain trained over said straight portion, and means for moving said finger vertically to feed said chain over said saddle to advance a succeeding link to welding position.

References Cited by the Examiner
UNITED STATES PATENTS

| 2,317,962 | 4/43 | Winter | 219—51 |
| 2,464,752 | 3/49 | Seeloff et al. | 219—51 |

RICHARD M. WOOD, *Primary Examiner.*